(12) United States Patent
Moore et al.

(10) Patent No.: US 9,005,386 B2
(45) Date of Patent: Apr. 14, 2015

(54) SLING LABEL AND METHOD FOR MAKING

(75) Inventors: Tom Moore, Simi Valley, CA (US); Ed Bergmann, Simi Valley, CA (US)

(73) Assignee: Pharmaceutic Litho & Label Company, Inc, Simi Valley, CA (US)

( * ) Notice: Subject to any disclaimer, the term of this patent is extended or adjusted under 35 U.S.C. 154(b) by 86 days.

(21) Appl. No.: 13/565,590

(22) Filed: Aug. 2, 2012

(65) Prior Publication Data

US 2013/0034679 A1  Feb. 7, 2013

Related U.S. Application Data

(60) Provisional application No. 61/574,486, filed on Aug. 3, 2011.

(51) Int. Cl.
| | | |
|---|---|---|
| B29C 65/48 | (2006.01) |
| B32B 37/26 | (2006.01) |
| B32B 38/04 | (2006.01) |
| B32B 38/10 | (2006.01) |
| B32B 38/14 | (2006.01) |
| C09J 7/02 | (2006.01) |
| G09F 3/02 | (2006.01) |
| G09F 3/10 | (2006.01) |

(52) U.S. Cl.
CPC ... *C09J 7/02* (2013.01); *G09F 3/02* (2013.01); *G09F 3/10* (2013.01); *C09J 2201/20* (2013.01); *C09J 2203/334* (2013.01); *G09F 2003/027* (2013.01); *G09F 2003/0273* (2013.01)

(58) Field of Classification Search
USPC ................. 156/247, 249, 250, 256, 265, 277
See application file for complete search history.

(56) References Cited

U.S. PATENT DOCUMENTS

| 5,591,290 A | * | 1/1997 | Walter et al. .................. 156/152 |
| 5,738,381 A | * | 4/1998 | Treleaven et al. ............... 283/81 |
| 5,782,495 A | * | 7/1998 | Grosskopf et al. ............... 283/81 |
| 5,823,503 A | * | 10/1998 | Wasserman ................... 248/683 |

FOREIGN PATENT DOCUMENTS

JP    09254282 A * 9/1997 ............... B31D 1/02

OTHER PUBLICATIONS

English Abstract of JP 09-254282 (May 30, 2014).*
Machine English Translation of JP 09-254282 (May 30, 2014).*

* cited by examiner

*Primary Examiner* — Sing P Chan
(74) *Attorney, Agent, or Firm* — Colin P. Abrahams

(57) ABSTRACT

A sling label comprises a single layer label portion having an upper surface and a lower surface, a cut in the label portion forming a sling, and adhesive on the lower surface of the label portion. The adhesive is inactivated on the lower surface of the label corresponding to the position of the sling. Further, a method for making a sling label comprises placing a single layer label portion over a backing layer so that the label portion adheres to the backing layer by means of the adhesive, and inactivating a portion of the adhesive on the lower surface of the label portion. A diecut is made in the label portion where the adhesive on the lower surface of the label portion has been inactivated, and the label portion is re-fastened to the backing layer.

13 Claims, 2 Drawing Sheets

SLING LABEL AND METHOD FOR MAKING

CROSS REFERENCE TO RELATED APPLICATIONS

This application claims the benefit of U.S. Provisional Patent Application No. 61/574,486 filed Aug. 3, 2011, the content of which is incorporated herein by reference in its entirety.

FIELD AND BACKGROUND OF THE INVENTION

This invention relates to a sling label, and a method for making such a label. The sling label is one which is often typically used in the pharmaceutical industry, but is not limited thereto.

Labels are extensively used on or with pharmaceuticals and related products. The labels, which may be printed on the packaging or inserted in the packaging of a pharmaceutical container, will typically provide basic safety information relating to the contents of the container, and may also provide additional and detailed information on the pharmaceutical contained in the container, especially in the area of pharmaceutical products where specific information on properties, side effects and characteristics of the products are necessary. Further, labels may be otherwise specialized in their construction and components, and may, for example, have peel off sections and tabs, booklets, as well as slings, hangers and the like for a wide variety of uses. These additional components make the label, particularly one used in the pharmaceutical industry, a vital and important element to further the safety, handling and use of the product.

SUMMARY OF THE INVENTION

According to one aspect of the invention, there is provided a sling label comprising a single layer label portion having an upper surface and a lower surface, a cut in the label portion forming a sling, and adhesive on the lower surface of the label portion, the adhesive being inactivated on the lower surface of the label corresponding to the position of the sling.

Preferably, the label portion has an upper edge and a lower edge, and the cut in the label portion comprises a diecut substantially parallel to the lower edge along at least a part of the diecut. In one embodiment, the inactivated adhesive on the lower surface of the label portion is covered with a deadening agent; in another, the inactivated adhesive on the lower surface of the label portion comprises an absence of adhesive or the covering of the adhesive.

Preferably, the label portion has printed material on the upper surface thereof. Further, the sling may be configured so that opposing ends thereof are located at approximately opposite sides of a container when the sling label is mounted or pasted on the container.

The label portion may further comprise at least one peel off tab, and a booklet mounted on the upper surface of the label portion. A booklet cover member may releasably secure the booklet to the upper surface of the label portion.

According to another aspect of the invention, there is provided a method for making a sling label comprising: placing a single layer label portion having an upper surface, a lower surface, an upper edge and a lower edge, and an adhesive on the lower surface over a backing layer so that the label portion adheres to the backing layer by means of the adhesive; separating the single layer label portion from the backing layer; inactivating a portion of the adhesive on the lower surface of the label portion; making a diecut in the label portion at the location where the adhesive on the lower surface of the label portion has been inactivated; and re-fastening the label portion to the backing layer.

An area extending from the lower edge of the label portion over a part of the lower surface of the label portion may be inactivated, preferably by a deadening agent. Printed or graphic material or information may be placed on the upper surface of the label portion.

In one embodiment, at least one peel off tab is formed on the label portion. Further, a booklet may be mounted over at least a part of the upper surface of the label portion, and a cover may be placed over the booklet, the cover having adhesive thereon whereby the booklet is secured to the upper surface of the label portion.

In a preferred form of the present invention, there is provided a label with a sling, the label essentially comprising a single layered label portion releasably mounted on a liner or backing or other appropriate stock. The label with the sling forming a part thereof is manufactured according to a preferred process of the invention, and various or selected areas thereof are covered with adhesive, adhesive deadeners, or have patterned adhesive layers according to the nature and configuration of the label. The sling is configured by making the necessary cuts in the single layer label, so that with even patterned layers of adhesive, or adhesive with selectively located deadeners, the sling portion which is cut into the label portion can ultimately be partially peeled away from the label portion, so as to be attached to the label portion only at its ends, thereby providing a strip or other such structure by means of which the bottle or the container upon which the sling label is mounted can be suspended. As is well known in the health industry, it is often desirable to turn a bottle or container upside down so that its contents can flow from the container in a calculated manner and with a predetermined flow or exit rate, and a sling label including a sling or hanging portion by means of which the bottle can be suspended is a critical feature which enables this to occur.

In one form of the invention, the material used to construct the label of the invention is a Fasson Valeron stock which may be either clear or white or such other color or transparency that may be desired. This arrangement allows the possibility of a void in the adhesive, and one desired purpose of the void is to ensure to the extent feasible that there is no gumming on the sling portion of the label, which would obviously impair its function and operation. A poly or paper liner may be used.

In one embodiment of the invention, the stock may be placed on an unwind mechanism of a label machine (often a complex, large and expensive piece of machinery), with the liner side on the top or facing upward, and a label portion attached to the liner at the bottom thereof, or facing downwardly. The liner is then separated from the base stock, with the liner moving forward in one part of the machinery, and the base stock moving forward at the same pace in another part of the machinery. As the liner moves through a print station of the machinery, or a point at which some treatment or process occurs to the label passing therethrough, a deadening agent or similar such composition is applied to the back of the label. This has the effect of deadening selected portions of the adhesive on the back of the label, preferably at least over those areas or portions which will subsequently comprise the sling or hanger portion of the label. Preferably, the deadening will extend all the way to the sides of the label in accordance with one aspect of the invention.

The deadening of the adhesive will in one form extend from the top of the sling portion to approximately the mid-center of the label.

As the manufacturing process continues and the liner and label continue to move through the machinery, the liner is then re-laminated to the base material at a turn bar. At a turn bar appropriately placed and constructed in the machinery, the stock is flipped so that printing of information, product name, logos or such other material, can be carried out on the face stock. Therefore, a second station is provided which, in one form of the invention, comprises the location where a top coating is printed on the face stock based on the nature and exigencies of the pharmaceutical product, the manner in which it is to be used, and such warnings that may be appropriate in the circumstances.

Subsequent stations may be provided in accordance with the invention. In one form, these subsequent stations may comprise, for example, stations number three to number eight, and these may be used for printing any additional art, text, or such other material as designated by the customer or user, and required on the label.

Thereafter, the stock moves to that part of the machine in which it is die cut in order to cut a sling or hanging portion into the label portion. The die cut is preferably near the outermost edge of the label and sling, so that an edge of the label is also the edge of the sling, in this way forming the completed sling label. In this manner, a single layer of label is appropriately applied with adhesive, adhesive deadening areas are created, and the single layer of label is die cut so that a sling or hanging portion is formed therein, and can be moved and separated other than at its ends in order to suspend a container upon which the label of the invention is applied.

It is to be noted that, prior to the cutting of the label, there is a continuous piece of stock or label portion on the liner. Once cut, however, a plurality of labels is formed and serially disposed on the liner. Each of the plurality of individual labels when mounted on the liner can be appropriately rolled so that labels can be dispensed as needed. Furthermore, it is to be noted that the sling or hanger is cut on each label. Preferably, the cut sling or label forms the lower edge of the label. However, the sling can be located and die cut at any point or position in the label, as may be desired in a particular application. This may be achieved, for example, by having a pair of substantially parallel die cuts formed in the label, which will constitute the sling.

Thereafter, the liner edges are trimmed to remove unnecessary remaining portions which will no longer be used, and waste is removed. A roll of multiple labels each having the sling or hanger cut into the stock is thus formed according to this process, generally comprising the single layer label having adhesive on the back thereof, with a die cut sling or hanger which can be easily separated from the remaining portion of the label, except at its edges, since adhesive which may have been present at the region of the sling label has been deadened or otherwise inactivated.

It is thus to be noted that there is a void or absence of adhesive on the relevant portions of the stock, such as where the sling will need to be peeled off the bottle, or, in an alternative embodiment, an adhesive deadening agent is thereafter used to inactivate the adhesive so that the sling or hanger can readily be removed along the die cut lines without the adhesive being a problem. Whether adhesive voids are left on the stock, or adhesive is applied and thereafter deadened as described above, will depend on which may be most appropriate in the circumstances, and the particular preferences of the customer. The inactivating of the adhesive may take any form or pattern, as may be needed.

It will be appreciated, of course, that the diecut forming the sling or hanging portion of the label is such that the sling will remain connected, preferably at its remote or opposing ends, to the label. Therefore, when the sling is removed from its position on the label, and rotated or turned so as to constitute an operable hanging member, it will still be connected to the label at its edges.

The invention also relates to placing a book on the label, the book being held on the label by a cover or clear vinyl, the cover generally extending beyond the edges of the label and having adhesive edges which stick on the sides, or on top, or on the bottom, of the label, as desired. Such a book or booklet may be applied in one pass, or at one station in the machinery, which is an advantage of the single layer label with the sling or hanger, as described. Where multiple layers of label are used, this may typically necessitate two passes for the application of the booklet, and the single layer construction therefore facilitates more efficient manufacture. Thus, the single layer construction is not only more efficient in terms of the process of manufacture of the label itself, but also allows various accessories and additional components, such as the booklet, to be mounted on the label in a simpler and more efficient manufacturing process.

The booklet itself maybe of any convenient size and configuration, and may cover all or a part of the label. In a preferred embodiment, the booklet extends from side edge to side edge of the label, or close their to. Preferably, the booklet is die cut once it is placed on the label. The purpose of the die cut is to trim the cover of the booklet, so as to ensure that it is neat and secure on the label. Further, appropriate trimming will also enable the book to be opened for use, and where the booklet is so constructed, allow it to be closed once more after use. In one preferred embodiment of the invention, a further die cut made on the booklet cuts the adhesive part of the upper and lower edges of the cover and possibly the book so as to enable the book to open and be read.

The label is preferably designed to wraparound a bottle, preferably one containing a pharmaceutical composition or materials, and to come back on, or overlap, on itself. The label, when mounted on the bottle in this wraparound fashion, can have its sling portion pulled off or out of the body of the label in order that the sling portion may be positioned over or mounted on a bracket or other structure, thereby enabling the container to be suspended in an upside down or substantially inverted position to allow discharge of the contents by gravity.

A peel tab may also be formed on the label. In this regard, the peel tab is preferably provided on the top of the label, which allows the peel tab to be removed. However, the peel tab may be mounted at any convenient position on the label, and is not limited to a specific location. A silicone layer may be formed only at that area location where the peel tab overlies or covers the label to stop it from sticking to the label so hard that it cannot be removed. This configuration therefore effectively maintains the peel tab in the desired position on the label, but allows its removal by simply peeling it off, with no or minimal sticky residue. In this regard, the silicone layer constitutes a type of release coat insofar as it relates to the peel tab and its ability to be easily and effectively removed from the label. In one embodiment, the silicon layer is applied at least where the peel tab will be placed, but it may be over the entire surface of the label as well.

DETAILED DESCRIPTION OF THE INVENTION

Reference is now made to the accompanying drawings which show various aspects and embodiments of a label and its method of manufacture in accordance with several aspects of the invention.

The basic label in accordance with the invention comprises a single layer label adhesively mounted on a liner or backing. The label may be removed from the liner or backing, and the label has a top surface and a bottom surface, the bottom surface of which includes adhesive layer. When the label is peeled off the liner, the adhesive on the bottom surface of the label is exposed, and is used to firmly adhere and fasten the label to a container. Typically, such a container will be a bottle, of glass or plastic, containing a composition or material which may be used in the pharmaceutical industry (although the invention is not so limited). In a typical application of the present invention, the label will be used in the health and pharmaceutical industries, applied to a bottle in a manner such that the label has a sling or hanger from which the bottle can be suspended from a bracket or other structure in a substantially inverted or upside down position so that the contents of the bottle can be discharged through tubing or other devices in a controlled manner.

Figure 1:
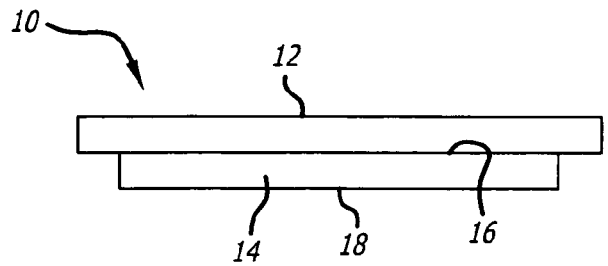
FIG. 1 is a schematic section through the liner and label in accordance with one embodiment of the present invention.

FIG. 1 of the drawings is a schematic representation of a label 10 of the invention comprising a backing or liner 12, and a label portion 14. The label portion 14 has a lower surface 16 and an upper surface 18. The lower surface 16 will have thereon and adhesive layer by means of which it remains on the backing or liner 12 until needed, and can thereof to be peeled off the backing 12. The adhesive layer on the lower surface 16 of the label portion 14 is then used to fasten the label 16 to a bottle or other desired container.

Figure 2:
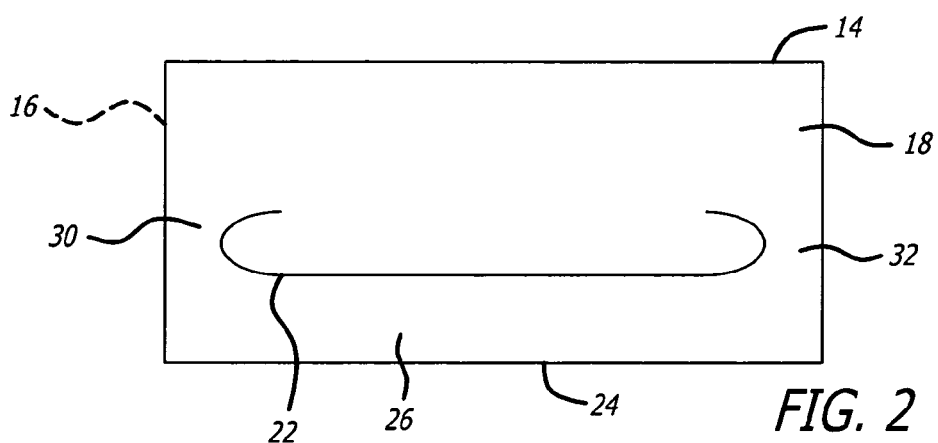
FIG. 2 is a top schematic view of a label in accordance with the invention including a diecut sling or hanger portion thereof.

FIG. 2 of the drawings shows a schematic representation of a label 14 of the invention. In this label 14, a diecut 22 has been made near the lower edge 24 of the label 14. The diecut 22 effectively creates a sling or hanger portion 26. The sling 26 remains in the position shown in FIG. 2 of the drawings until it is needed to suspend the bottle container upon which the label 14 is mounted. In the manufacturing process, which will be described briefly below, the lower surface 16 of the label 14 at the area of the sling 26 has the adhesive layer deadened or inactivated so that the sling 26 can be peeled off the bottle.

The sling 26 has remaining connections 30 and 32 to the body of the label 14. In one form of the invention, the connections 30 and 32 may be configured so as to be on approximate opposite sides of the bottle when the label is mounted on the bottle, so that the sling 26 effectively suspends the bottle from approximately opposing sides thereof. This may assist in the proper orienting of the bottle to facilitate optimal discharge of the contents.

Figure 3:
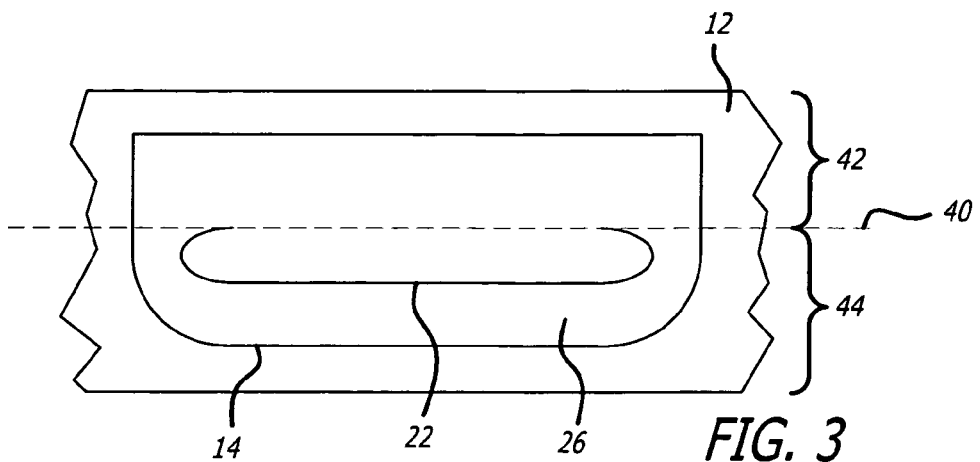
FIG. 3 is a schematic top view of a label mounted on a liner in accordance with the present invention, including a diecut made in the label to form a sling portion.

With reference to FIG. 3 of the drawings, there is shown a label 14 mounted on a backing 12. A diecut 22 is cut into the label 14, thereby creating the sling 26. Reference line 40 going approximately through the center of the label 14 illustrates the approximate demarcation line between the lower surface of the label which has adhesive thereon, and the lower surface of the label where the adhesive is deadened, or inactivated, or removed. The upper part of the label, indicated by reference numeral 42, has adhesive thereon so that the lower surface thereof will adhere both to the backing 12 until the label is needed, and when the label 14 is removed, such adhesive will be used to fasten or adhere the label to the bottle or container. The lower part of the label, indicated by reference numeral 44, is the portion over which the adhesive has been inactivated or deadened. It is noted that the lower part of the label is that in which the sling 26 has been diecut. The inactivation of the adhesive on this portion of the label 14 facilitates easy rotating or turning of the sling 26, since the sling 26 is not attached to the bottle or container by any adhesive, and it can be manipulated by the user and moved to a position in which it can operate as a sling for suspending the bottle on which the label is mounted.

Figure 4:
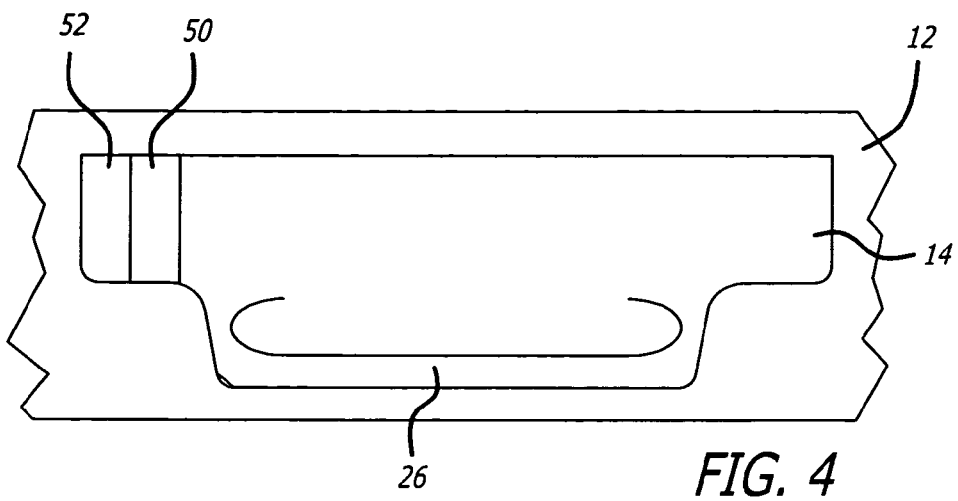
FIG. 4 is a schematic top view of a label in accordance with a further aspect of the invention including peel off labels on a portion of the label.

In FIG. 4 of the drawings, there is shown a further embodiment of the invention, including a label generally as discussed with reference to the previous figures, the label further incorporating two peel off tabs or labels 50 and 52, which can be removed from the label and used by hospitals, health professionals or others for various purposes. The side of the label which includes the peel off tabs 50 and 52 is, in one preferred embodiment of the invention, designed and configured to overlap the other side of the label when the label is placed on a bottle or container.

Figure 5:
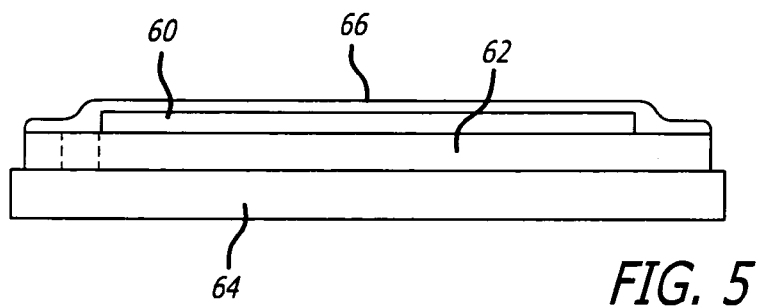
FIG. 5 is a schematic section through a label in accordance with a further aspect of the invention, including a book and cover mounted on the label.

In FIG. 5 of the drawings, there is shown a further embodiment of the invention, including a label generally as discussed with reference to the previous figures, the label further comprising a booklet 60 mounted on the upper surface of the label 62, the label 62 being mounted on a liner or backing 64. The booklet 60 is secured to the upper portion of the label 62 by means of a cover 66, which may be made of plastic or vinyl and overlaps the edges of the booklet and adhesively engages with the upper surface of the label. Note that the label configuration shown in FIG. 5 of the drawings may or may not include peel off tabs of the type described in the previous figures.

Figure 6:
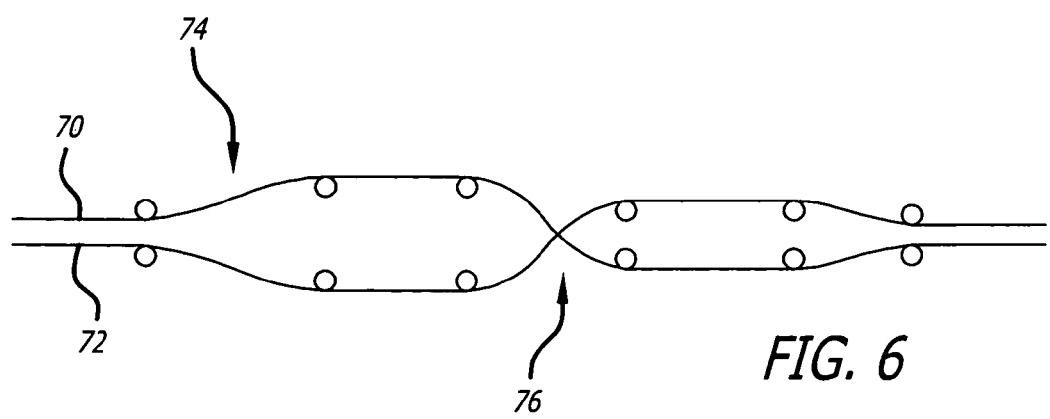
FIG. 6 is a simple schematic representation which shows some of the steps in the manufacturing process of a label in accordance with the present invention.

FIG. 6 of the drawings shows in a very schematic representation various manufacturing steps involved in the manufacture and creation of a label in accordance with the invention. A liner or backing 70 is adhesively attached to a continuous stock 72 from which the label will be created, the backing 17 and stock 72 being fastened to each other by adhesive layer on the lower surface of the stock 72. The backing 70 and stock or label layer 72 are separated or pulled apart from each other, as shown at approximate location 74. Note that the label layer 72 is a single layer component.

The liner and stock, at the source formed in a roll, are placed on the unwind mechanism, after which the two are separated as mentioned above. While separated, and at a first treatment or print station, the adhesive on the lower surface of the label stock is treated by the application of a deadening agent. The purpose of applying the deadening agent is to remove the adhesive characteristics or effects on the lower surface of the label at that point of the label where the sling or hanger will be formed. As a result, the sling or hanger formed in the label will not have on its lower surface any adhesive properties, and can be manipulated easily away from the remainder of the label, attached only at its ends.

The application of the deadening agent may take place in a number of different ways, and at selected points or areas on the lower surface of the label. For example, the deadening agent may be located on the adhesive on the lower surface of the label only at that point or at those areas where the sling is to be located. In another example, the deadening agent may be applied generally across a lower portion of the entire label from side to side, as generally illustrated in FIG. 3 of the drawings. In yet a further example, deadening agent may be applied to a lower portion of the label, but not completely there across. Further, patterned areas of deadening may be formed. These are examples only, and it will be appreciated that the deadening can be applied to the lower surface of the label to inactivate the adhesive thereon in any manner or configuration which would give effect to the given purpose, namely, to prevent the sling from adhering to a bottle on which the label is mounted, and to allow the sling portion of the label to be easily peeled away from the container along the length of the sling, but with the edges thereof of course still attached to the label.

Once a selected and appropriate area of deadening agent is applied to the adhesive on the lower surface of the label, the label and liner advance in the machinery to subsequent stations. It will be seen at region 76, there is schematically shown the label being moved to the top, so that it can receive further processing and treatment. At subsequent stations, the label may therefore be provided with the application of any written, textual, photographic or other material, as may be required for disclosure purposes relating to the content of the container on which the label will be applied. Additional information, including makeup and constituents of the contents, side effects, dosages, and any such other material that may be relevant or desired, will also be printed on the label.

The label then moves on to a station where a diecut is formed in the label, the diecut being of the type shown in the previous figures, including diecut 22 in FIGS. 2 and 3 of the drawings. The diecut is made through the single layer of the label only, and preferably not in the backing or liner. However, if the diecut did to some extent penetrate the liner, this is not likely to be prejudicial to the subsequent function and operation of the label. In any event, the diecut is made in the label such that the area between the diecut 22 and the lower edge of the label becomes eligible for use as a hanger or sling. The diecut into the label is such that the sling will have its ends (such as ends 30 and 32) permanently attached to the label, to ensure proper operation and sufficient strength between the sling and the remainder of the label to adequately support the container with all of its contents.

The label layer and the liner or backing are merged together merged together once more, with the label adhering to the liner by the remaining effective adhesive on the lower surface of the label which has not been previously deadened. This merging of the label and liner may take place either before or after the diecut has been made. The particular order or sequence of treatments may be varied, as best suited to specific needs. The area of contact between the remaining effective adhesive on the lower surface of the label and the upper surface of the lineup will be sufficient for storage and transportation purposes. The label is then rolled and stored, and the label of the invention will be maintained in this condition during storage and subsequent transplantation until such time as the label is required for its designated use.

It should be noted that the accompanying drawings, figures and sketches show various aspects of the invention including location of sling or hanger, portions and positions of deadened areas, adhesive applications and the like. Further, printing options and passes are also identified.

In one form, the same adhesive on the lower surface of the label may be formed consistently over the entire lower surface. Further, it should be noted that the deadening at the area of the sling will not, in one embodiment, be formed on the part with the peel tab is located.

The invention thus relates to a sling label which can be efficiently and effectively manufactured using simple sequential processes. The single layer structure of the label, into which the sling label is cut, facilitates the ability to manufacture a simple yet highly effective sling label.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A method for making a sling label comprising:
    placing a single layer label portion having an upper surface, a lower surface, an upper edge and a lower edge, and an adhesive on the lower surface over a backing layer so that the label portion adheres to the backing layer by means of the adhesive;
    separating the single layer label portion from the backing layer;
    inactivating a portion of the adhesive on the lower surface of the label portion;
    re-fastening the single layer label portion to the backing layer;
    making a first diecut in the label portion at the location where the adhesive on the lower surface of the label portion has been inactivated to form a sling; and
    making a second diecut in the label portion so as to shape the label with a higher central portion and lower lateral portions.

2. A method of making a sling label as claimed in claim 1 wherein an area extending from the lower edge of the label portion over a part of the lower surface of the label portion is inactivated.

3. A method of making a sling label as claimed in claim 1 wherein the adhesive on the lower surface of the label portion is inactivated by a deadening agent.

4. A method of making a label as claimed in claim 1 further comprising the step of placing printed or graphic material or information on the upper surface of the label portion.

5. A method of making a label as claimed in claim 1 further comprising the step of forming at least one peel off tab on the label portion.

6. A method of making a label as claimed in claim 1 further comprising the step of mounting a booklet over at least a part of the upper surface of the label portion.

7. A method of making a label as claimed in claim 6 further comprising the step of placing a cover over the booklet, the cover having adhesive thereon whereby the booklet is secured to the upper surface of the label portion.

8. A method of making a label as claimed in claim 1 wherein the diecut in the label portion is made before the label portion and the backing layer have been re-fastened to each other.

9. A method of making a label as claimed in claim 1 wherein the diecut in the label portion is made after the label portion and the backing layer have been re-fastened to each other.

10. A method of making a label as claimed in claim 1 wherein all the steps in making the label are conducted in a single pass operation through a machine.

11. A method of making a label as claimed in claim 1 comprising the step of forming at least one peel off label on one lateral portion, the lateral portion having the peel off label being mountable over the other lateral portion when the label is mounted on a container.

12. A method of making a label as claimed in claim 11 wherein the lower surface of the label portion at the location of the peel off label is treated with a silicon deadening agent so that it can be peeled off the other lateral portion.

13. A method for making a sling label comprising:
    placing a single layer label portion having an upper surface, a lower surface, an upper edge and a lower edge, and an adhesive on the lower surface over a backing layer so that the label portion adheres to the backing layer by means of the adhesive;
    separating the single layer label portion from the backing layer;
    inactivating a portion of the adhesive on the lower surface of the label portion;
    re-fastening the single layer label portion to the backing layer;
    making a first diecut in the label portion at the location where the adhesive on the lower surface of the label portion has been inactivated to form a sling;
    making a second diecut in the label portion so as to shape the label with a higher central portion and lower lateral portions; and
    mounting a booklet on the label portion;
    wherein all of the above steps take place in a single pass operation.

* * * * *